United States Patent
Luechinger et al.

(10) Patent No.: US 8,191,587 B2
(45) Date of Patent: Jun. 5, 2012

(54) DOSAGE-DISPENSING DEVICE WITH A TAPPING MECHANISM

(75) Inventors: Paul Luechinger, Uster (CH); Marc Zehnder, Volketswil (CH); Eduard Fringeli, Bubikon (CH)

(73) Assignee: Mettler-Toledo AG, Greifensee (CH)

( * ) Notice: Subject to any disclaimer, the term of this patent is extended or adjusted under 35 U.S.C. 154(b) by 1150 days.

(21) Appl. No.: 12/029,926

(22) Filed: Feb. 12, 2008

(65) Prior Publication Data

US 2008/0190513 A1    Aug. 14, 2008

(30) Foreign Application Priority Data

Feb. 13, 2007   (EP) ..................... 07102300

(51) Int. Cl.
*B65B 1/20* (2006.01)
*B65B 3/18* (2006.01)
*B67C 3/26* (2006.01)
*B01F 11/00* (2006.01)
*B01F 7/00* (2006.01)

(52) U.S. Cl. ............ 141/77; 141/72; 141/74; 141/75; 141/78; 141/268; 366/114; 366/279

(58) Field of Classification Search ............ 141/72, 141/74, 75, 77, 78, 83, 268, 271; 366/110, 366/111, 114, 116, 279; 222/181.1, 181.3
See application file for complete search history.

(56) References Cited

U.S. PATENT DOCUMENTS

| | | | | |
|---|---|---|---|---|
| 3,078,685 A | * | 2/1963 | Flournoy | 53/432 |
| 6,056,027 A | * | 5/2000 | Patterson | 141/370 |
| 6,674,022 B2 | * | 1/2004 | Fermier et al. | 177/60 |
| 7,284,574 B2 | * | 10/2007 | Fontaine et al. | 141/72 |
| 2006/0011653 A1 | | 1/2006 | Fontaine et al. | |
| 2006/0137760 A1 | * | 6/2006 | Dubois et al. | 141/1 |

FOREIGN PATENT DOCUMENTS

DE    1 012 250 (B)    7/1957

OTHER PUBLICATIONS

WO 01/28615, Paul Rand, Medicament Dispenser, Apr. 26, 2001.*
European Search Report (with English language translation of category of cited documents) dated Jul. 6, 2007.

* cited by examiner

*Primary Examiner* — Len Tran
*Assistant Examiner* — Ryan Reis
(74) *Attorney, Agent, or Firm* — Buchanan Ingersoll & Rooney PC

(57) ABSTRACT

A dosage-dispensing device for dosage material in powder- or paste form includes a holder device and at least one receiving device. At least one dosage-dispensing unit can be set into, as well as removed from, this receiving device. The dosage-dispensing device further includes at least one actuator whose action is directed at the receiving device. The receiving device is pivotably supported on the holder device with the freedom of performing a pendulous movement. The actuator can generate oscillatory pendulous movements of the receiving device.

13 Claims, 6 Drawing Sheets

DOSAGE-DISPENSING DEVICE WITH A TAPPING MECHANISM

RELATED APPLICATION

This application claims priority under 35 U.S.C. §119 to European Patent Application No. 07102300.6 filed in the European Patent Office on Feb. 13, 2007, the entire content of which is hereby incorporated by reference in its entirety.

TECHNICAL FIELD

A dosage-dispensing device for substances in powder form is disclosed, such as a dosage-dispensing device which includes a receiving device with the capability to loosen the dosage substance contained in a dosage-dispensing unit.

BACKGROUND INFORMATION

Dosage-dispensing devices for pulverous substances are used in particular for applications where small dosage quantities are dispensed with high precision into small target containers. Such target containers are often set on a balance in order to weigh the dosage substance delivered from the dosage-dispensing device, so that the dispensed substance can subsequently be processed further according to given instructions.

The substance to be measured out is located for example in a dosage-dispensing unit which has a source container and a dispensing head. It is desirable that the dosage substance be delivered to the outside through a small delivery orifice of the dosage-dispensing unit, so that the substance can be filled in a targeted stream into a container with a small aperture cross-section.

Many pulverous substances flow almost by themselves in an even stream out of a narrow delivery orifice, comparable to the flow of the sand in an hourglass. In this case, the mass flow rate of the substance can be controlled simply by changing the aperture cross-section of the delivery orifice with a suitable aperture valve device. However, the particles in many pulverous substances have a tendency to stick together. Furthermore, most powders are compactible, so that lumps of compacted powder will form in the dosage substance, whereby the delivery orifice can be partially or completely clogged up. As an example, the particles of cornstarch have a strong tendency to stick together. In addition, cornstarch is very compactible. Consequently, in view of these properties, cornstarch is used frequently as a test material for evaluating the performance of dosage-dispensing devices. The problems caused by the cohesion and compactibility of the dosage material, also referred to as the "stickiness" of a dosage material, have led to numerous proposals for a solution and types of dosage-dispensing devices or, more specifically, their dispensing heads. There are for example dispensing heads with conveyor screws serving to move the sticky dosage material from the source container to the delivery orifice of the dispensing head. The known state of the art further includes stirring mechanisms and scraping devices serving to scrape the dosage material from the inside walls of the source container and the dispensing head and to propel it towards the conveyor screw. The stirring mechanisms can further serve to prevent the formation of so-called bridges of the dosage material in the source container. The known state of the art further includes tapping and vibrating devices which are used instead of, or in combination with, a stirring mechanism.

A possible solution for the aforementioned problems is disclosed in US 2006/011653 A1. A dosage-dispensing device for doses of pulverous substances in the range from a few milligrams to several grams with a precision of better than +/−5% of the target weight has a dosage-dispensing unit which includes in essence a source container and a dispensing head. The inside wall of the dispensing head is shaped with a conically narrowing taper from the juncture with the source container towards the delivery orifice. In the operating state of the apparatus, the delivery orifice is located at the underside of the dosage-dispensing unit and thus below the source container. In the operating state of the apparatus, free-flowing dosage material inside the dosage-dispensing unit will flow towards the delivery orifice under the influence of gravity. The delivery orifice is equipped with an aperture-controlling valve which serves to regulate the mass flow rate of the dosage material delivered to the outside. The dosage-dispensing device includes means for vibrating and/or tapping the container and can further include a stirring mechanism which can in addition be moved up and down in a straight line along its central longitudinal axis or axis of rotation.

In tests that were conducted with cornstarch it has been found that delivering the latter from dosage-dispensing units of a variety of configurations can cause considerable difficulties. The flow capability of this type of a dosage substance can depend directly on how loosely it is agglomerated, a property which is also referred to as bulk density. Some of the experiments could have the outcome that the dosage material was compacted instead of loosened when a stirring mechanism and/or vibrating means was employed. This had the result that in spite of a completely opened aperture orifice, no dosage material could be delivered out of the dosage-dispensing unit.

SUMMARY

A dosage-dispensing device is disclosed which makes it possible to condition, specifically to loosen, the dosage material inside the dosage-dispensing unit prior to and for the dosage-dispensing process.

A dosage-dispensing device is disclosed for dosage material in powder- or paste form comprising: a holder device; at least one receiving device for receiving at least one removable dosage-dispensing unit; and at least one actuator whose action is directed at the receiving device, wherein the receiving device is pivotably supported on the holder device and configured with freedom for performing an oscillatory pendulous movement in response to operation of the actuator.

BRIEF DESCRIPTION OF THE DRAWINGS

Details of a dosage-dispensing device according to the disclosure are presented in the description of the embodiments that are shown in the drawings, wherein.

DETAILED DESCRIPTION

Figure 1:
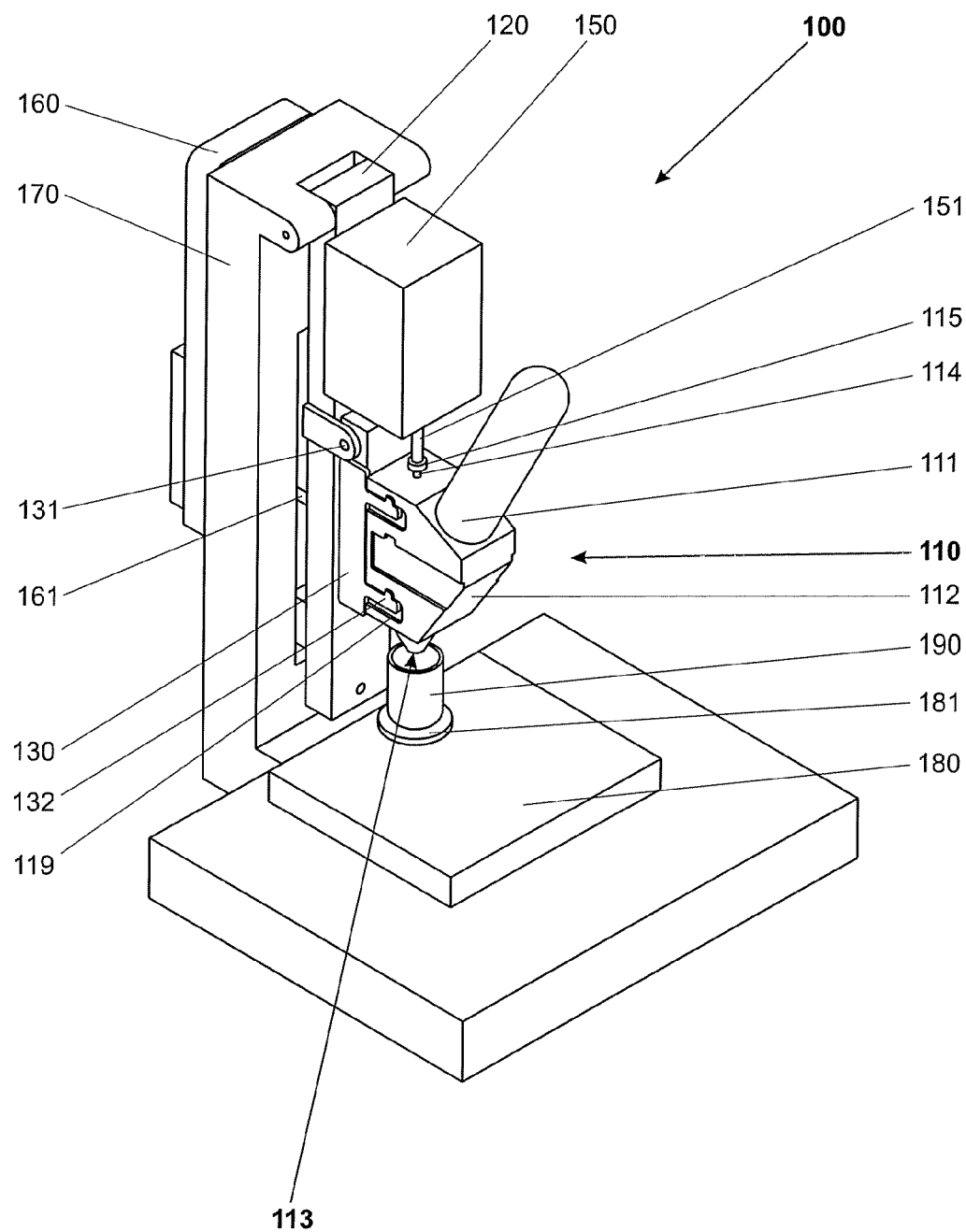
FIG. 1 represents a three-dimensional illustration of an exemplary dosage-dispensing device with a holder-device that is pivotably suspended like a pendulum and with a receiving device which is pivotably supported on the holder device and in which a dosage-dispensing unit is seated, whose closure shaft is connected through a coupler device to the drive shaft of a drive device that is arranged on the holder device.

An exemplary dosage-dispensing device is disclosed for dosage material in powder- or paste form a holder device and at least one receiving device. At least one dosage-dispensing unit can be set into, as well as removed from, this receiving device. The dosage-dispensing device includes at least one actuator whose action is directed at the receiving device. The receiving device is pivotably supported on the holder device with the freedom of performing a pendulous movement. The actuator can generate oscillatory pendulous movements of the receiving device.

To produce these movements, the actuator applies a short sequence of several tapping strokes to the receiving device. As a result of the tapping strokes, the receiving device begins to swing like a pendulum. The pendulum-swing frequency of the receiving device can, but need not be, in resonance with the tapping frequency of the actuator. This can have the result that the shock waves or mechanical pulses produced by the tapping strokes differ from each other in their direction. Even with a very small pivoting angle of +/−1°, it was possible to achieve excellent results in regard to loosening the dosage material even if the latter was very "sticky".

The fact that the receiving device according to the disclosure can perform so well in loosening the dosage material can be attributed, at least in part, to the variation of the direction of the mechanical pulses that occurs as a result of the pendulous motion. Unlike the situation where the action of an actuator is directed in a straight line, the arcuate pendulum movement has the effect that powder particles with for example a flake-like particle shape can be prevented from aligning themselves in a direction that would be prescribed by a linear movement of the actuator. A compaction of the kind observed with linear-motion actuators can be thereby prevented.

Problems associated with a compaction of dosage material can also be caused by the state-of-the-art stirring mechanisms whose rotation in the prescribed direction leads to a continuous compaction of the dosage material. Furthermore, the stirrer blades of the stirring mechanisms are not reaching all areas inside the dosage-dispensing unit, so that lumps accumulate in individual "dead" corners whereby the delivery orifice of the dosage-dispensing unit can be clogged up.

The impact pulses of the actuator in their combined effect with the pivotably supported receiving device can thus serve in particular to condition the dosage material contained in the dosage-dispensing unit immediately before the actual dispensing process. As a concrete result, the flow capability of the dosage material can be improved before the dispensing process and a more homogeneous flow behavior of the dosage material is achieved.

Of course, the mechanical impact pulses of the actuator can also serve to advance the dosage material within the dosage-dispensing unit, i.e., to assist in the delivery process.

The pivot axis of the receiving device can be arranged so that the axis is essentially horizontal when the dosage-dispensing device is in its operating position. As a result of the pendulum-swing movement, the dosage material is tossed up inside the source container, comparable to the winnowing of grain. In a dosage material that contains (e.g., consists of) different substances with unequal densities, the dosage-dispensing device can additionally be equipped with a stirring mechanism in order to counteract the tendency of the component materials to separate themselves from each other.

Depending on the layout of the dosage-dispensing unit, the dosage-dispensing device can have a drive device with a drive shaft, wherein the drive shaft can be connected by means of a coupler device to a closure shaft and/or a stirring-mechanism shaft of the dosage-dispensing unit. If the drive device does not participate in the movement of the receiving device, but has a rigid connection to the holder device, the coupler device can have a length- and angle-adaptation capability in order to absorb axial displacements and changes of the angle between the respective rotary axes of the closure shaft and the drive shaft which occur as a result of pivoting movements. In order to keep the required length- and angle adjustment as small as possible, the coupler device can, for example, be arranged in a horizontal plane that contains the pivot axis. The dosage-dispensing device can, for example, be equipped with a control- and regulation device which controls or regulates the mass flow rate delivered from a delivery orifice of the dosage-dispensing unit during a dosage-dispensing process. This control- and regulation device can also serve to activate the actuator and, if it is designed with the requisite capability, to influence the intensity of the mechanical impact pulses.

The reactive forces of the mechanical impact pulses of the actuator can be taken up in a variety of possible ways. In a first embodiment, the actuator can be functionally interposed between the holder device and the receiving device. "Functionally interposed" in the present context means that the reactive forces of the actuator are taken up by the holder device and the action forces of the actuator bear against the receiving device. The actuator can but does not necessarily need to be physically arranged between the receiving device and the holder device. Because of spatial considerations it can be advantageous for the actuator to be arranged behind the holder device and to act on the receiving device through a push rod, wherein the latter reaches through a passage opening of the holder device.

In a second embodiment, the actuator can be functionally connected to the receiving device, and the actuator can include a pendulum that serves to absorb the reactive forces of the mechanical impact pulses of the actuator. This concept can avoid or at least strongly reduce the transmission of tremors to the support base which could affect or even compromise the proper functioning of further devices, for example a balance for the weighing of the quantity of dosage material dispensed into a target container. The swing amplitude of this pendulum can be delimited by means of damper elements.

The pendulum can include a pendulum rod and a pendulum mass, with the pendulum mass being adjustable by adding or removing weight pieces. This allows the effect of the actuator on the receiving device or on parts connected to the receiving device to be changed. A change of the effects of the actuator can of course also be achieved through an arrangement where the pendulum mass can be moved along the pendulum rod and locked in any desired place on the pendulum rod.

If the mass moment of inertia of the pendulum relative to its pivot axis is at least equal to the mass moment of inertia of the receiving device with an installed dosage unit relative to the respective pivot axis, no resultant forces or moments have to be taken up by the support base by way of the holder device.

The larger the amplitudes of the impact pulses or shock waves that are to be generated in the receiving device, the larger the mass moment of inertia of the pendulum needs to be in relation to the mass moment of inertia of the receiving device. As a way to achieve particularly large amplitudes, essentially the entire holder device can be pivotably suspended as a pendulum mass.

As mentioned previously herein, the pivoting movements can cause a separation of the mix components of the dosage material. A measure that can be used instead of, or in combination with, a stirring mechanism to prevent the separation effect is to limit the range of the pendulous movement with a variety of means, in particular with adjusting elements and/or positioning- and end-stop elements. The adjusting elements are essentially adjustable end stops which may be provided with damper elements. The damper elements can be simple rubber elements, but it is also possible to use hydraulic elements or gas damper elements as well as actively controlled damper elements. Spring elements and damper elements can have linear as well as progressive characteristics.

As mentioned hereinabove, a variety of experiments have shown that with the receiving device according to the disclosure particularly good results can be achieved if the actuator acts on the receiving device through tapping strokes against the receiving device or, in other words, if the actuator generates shock waves in the receiving device. The shock waves are transmitted through the receiving device to the dosage-dispensing unit. In order to achieve an effective transmission of the shock waves, the dosage-dispensing unit should be connected to the receiving device as rigidly as possible. A possible variant embodiment of an actuator has a hammer mass which can be driven by a propulsion spring, wherein the propulsion spring can be tensioned by a tensioning mechanism and instantaneously released. At the moment of release, the hammer mass is accelerated by the propulsion spring and produces a shock wave in the receiving device through the impact of the hammer mass on the receiving device. Of course, it is also possible to use other actuators such as for example several serially connected piezoelectric actuators or an eccentric vibrator of the kind used in mobile telephones for alerting the user without sounding a ring tone.

If the dosage-dispensing device has an actuator whose pulse amplitude is not adjustable, the dosage-dispensing device can also be equipped with at least one adjustable spring element serving to set the pulse amplitude of the actuator, and/or the dosage-dispensing device can have a damper element. These elements can be arranged between the receiving device and the holder device. In an exemplary case, the elements are designed so that they delimit the pivoting range as well as serve for the setting of the pulse amplitude.

If the user wishes to take substances out of several dosage-dispensing units and mix them in a target container, this can involve a certain amount of time and effort if the dosage-dispensing units have to be exchanged in the dosage-dispensing device manually or in an automated sequence. The time and effort involved may in some circumstances be reduced but still not eliminated by manually or automatically transporting the target container to further dosage-dispensing devices.

The dosage dispensing device therefore can comprise a holder device with a horizontal linear guide. A first main part of the holder device is connected by the linear guide to a second main part and constrained to the latter with the freedom of linear, essentially horizontal movement. A plurality of receiving devices are arranged side-by-side and capable of individual pivoting movement. With this specially designed holder device it is possible that the dosage-dispensing units seated in the receiving devices can be sequentially brought into a working position through a simple linear travel movement. The working position is the position in which the dosage-dispensing unit can be connected to the drive device. The target container is normally also arranged in the area of the working position, in most cases below the dosage-dispensing unit, more specifically below the delivery orifice of the dosage-dispensing unit.

As a space-saving measure, the first main part of the holder device can also be given a ring-shaped design and supported on the second main part with the mobility to rotate about a vertical axis. Arranged side-by-side on the outside of the ring-shaped first main part of the holder device are several receiving devices, supported so that each has the ability of individual pivoting movement.

To avoid the need for a dedicated actuator for each receiving device in an arrangement of multiple receiving devices, it is possible to arrange only a single actuator in the area of the drive device, more specifically in the area of the working position. With the impact pulses of this single actuator it is possible to generate oscillatory pivoting movements only in the receiving device that is currently stationed in the working position.

It is known that pulverous dosage material is compactible and that the bulk density can vary widely within an accumulation of the material. Differences in the bulk density can occur already as a result of transporting a dosage-dispensing unit. Such variations have a direct effect on the mass flow rate in the delivery of the dosage material from the delivery orifice and make it very difficult to calculate in advance at what point in time the delivery orifice needs to be shut so as not to deliver too much of the dosage material. As has already been explained in detail above, the main task of the actuator in combination with the pivotably suspended receiving device is not primarily to assist the delivery during the dosage-dispensing process, but to loosen the dosage material in the sense of a pre-conditioning treatment in order to make the bulk density of the dosage material in the dosage-dispensing unit as homogeneous as possible.

A possible method for the dispensing of doses of pulverous dosage material with a dosage-dispensing device according to the disclosure can contain (e.g., consist of) the following sequence of steps:

in a first step, a dosage-dispensing unit is set into the dosage-dispensing device, and the dosage-dispensing unit is coupled to the drive device, in a second step, the dosage material is loosened with the actuator, in a third step, the desired target quantity of dosage material is delivered into a target container through the action exerted on the dosage-dispensing unit by the drive device, if called for, further target quantities are delivered into further target containers, and in a fifth step, the dosage-dispensing unit is removed from the dosage-dispensing device.

Of course, the loosening of the dosage material in the dosage-dispensing unit by the actuator can also take place between individual deliveries of target quantities into target containers and/or after the quantity of dosage material delivered has reached a specified amount.

As mentioned hereinabove, the loosening of the dosage material in the dosage-dispensing unit is effected by a plurality of mechanical impact pulses directed by the actuator against the receiving device. The different powders can also behave differently in regard to the loosening capability of the dosage-dispensing device according to the disclosure. In an ideal situation, preliminary trial runs are therefore conducted to determine for a specific dosage material the frequency and the amplitude at which the loosening effect for this dosage material can be maximized. The values of amplitude and frequency of the mechanical impact pulses which are optimally matched to the specific dosage material can be stored in the control- and regulation device and recalled when needed.

As has already been mentioned, the tapping frequency of the actuator is ideally not in resonance with the pendulum-swing frequency of the receiving device.

FIG. 1 represents a three-dimensional illustration of an exemplary dosage-dispensing device 100 with a holder-device 120 that is pivotably suspended like a pendulum from a pedestal 170 and with a receiving device 130 that is pivotably supported on the holder device 120 by means of a pivot axis 131. The pivot axis 131 is arranged orthogonal to the direction of gravity and thus essentially horizontal. Seated in the receiving device 130 is a dosage-dispensing unit 110 which includes in essence a source container 111 and a dispensing head 112. As a seat, the receiving device 130 has suitable holder elements 132 which reach with a form-fitting grip into the holds 119 formed on the dosage-dispensing head 112.

Arranged in the dosage-dispensing head 112 is a closure body (not shown in the drawing) which is capable of being driven in rotary motion and through which a delivery orifice 113 which is formed on the underside of the dosage-dispensing head 112 can be opened and closed. The closure body is connected to a closure shaft 114 which is constrained in the housing of the dosage-dispensing head 112 with the capability of being driven in rotary motion and/or linear displacement. This closure shaft 114 is connected through a coupler device 115 to a drive shaft 151 of a drive device 150. Due to the shock waves which are generated by an actuator 160 and transmitted to the receiving device 130 through a push rod 161 and which cause pivoting movements of the receiving device 130, it is necessary for the coupler device 115 to allow an angle adaptation and, for example, also a length adaptation between the respective rotary axes of the closure shaft 114 and the drive shaft 151 which occur as a result of pivoting movements. The closer the rotary axis 131 of the receiving device 130 is arranged to the rotary axis of the drive shaft 151, the smaller the required length adaptation. Below the delivery orifice 113, a target container 190 can be set up on a load receiver 181 of a balance 180. The weighing signals of the balance 180 can for example be used to influence the drive device 150 through a control- and regulation unit (not shown) in such a way that the outlet orifice 113 is shut off by the closure element when the target weight has been met which was entered in the control- and regulation unit of the dosage-dispensing device 100. However, it is considered self-evident that the closure process can be initiated already before the point of arriving at the target weight.

The design structure and function of the actuator 160 are described in detail hereinafter in the context of FIG. 5. The arrangement of the actuator 160 and of the drive device 150 on the holder device 120 and their pendulous suspension on the pedestal 170 for the purpose of absorbing the reactive forces of the actuator 160 are analogous to the third embodiment which is discussed in the description of FIG. 4.

Figure 2:
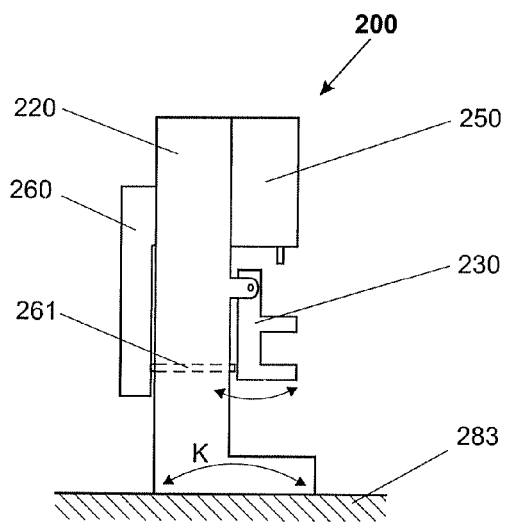
FIG. 2 is a schematic representation of an exemplary dosage-dispensing device shown in plan view in a first embodiment, wherein only the receiving device is pivotably supported.

FIG. 2 schematically illustrates a dosage-dispensing device 200 in a first exemplary embodiment shown in plan view. The holder device 220 on which the receiving device 230 is pivotably supported serves at the same time as a foot which allows the dosage-dispensing device 200 to rest on the support base 283. The actuator 260 is rigidly connected to the holder device 220, as is the drive device 250. The actuator 260 can exert its effect on the receiving device 230 through the push rod 161.

The actuator 260 generates shock waves which are transmitted to the receiving device 230 through the push rod 261. The dosage material contained in a dosage-dispensing unit that is seated in the receiving device 230 is loosened by the shock waves. The reactive forces generated at the same time by the actuator are channeled through the holder device 220 into the support base 283. As has already been described in the context of FIG. 1, the dosage-dispensing device 200 according to the disclosure can include a force-measuring device. A force-measuring device, specifically a balance, is in some cases sensitive in its reaction to tremors, specifically to vibrations of the support base 283. These vibrations are superimposed on the weighing signal and can be separated from the weighing signal with suitable filters in order to allow the correct weight value to be determined and to obtain a stable display indication. Due to the ways in which such filters operate, the delivery of a weighing signal can be considerably delayed. Depending on the type of balance or force-measuring device and due to properties inherent in its design layout, tremors with a horizontally directed amplitude are less critical than tremors with a vertically directed amplitude. However, with the arrangement of the receiving device 230 and the actuator 260 above the support base 283, oscillatory tilting moments K can occur in the area where the fastening surface of the holder device 220 meets the support base 283, wherein the magnitude of such tilting moments K depends on the distance of the mass center of gravity of the receiving device 230 from the support base 283 and the amplitude of the shock waves. Through the points of attachment of the holder device 220 which act as footholds, the tilting moments K are converted into vertically directed reactions. The delays caused by tremors with a vertical amplitude can have the result that the dosage-dispensing process takes considerably longer because, depending on the dispensing method, the target weight is reached in a stepwise approach. In addition, such vibrations can also have a negative influence on further gravimetric measuring instruments and further dosage-dispensing devices that are set up in immediate proximity to the dosage-dispensing device 200.

Figure 3:
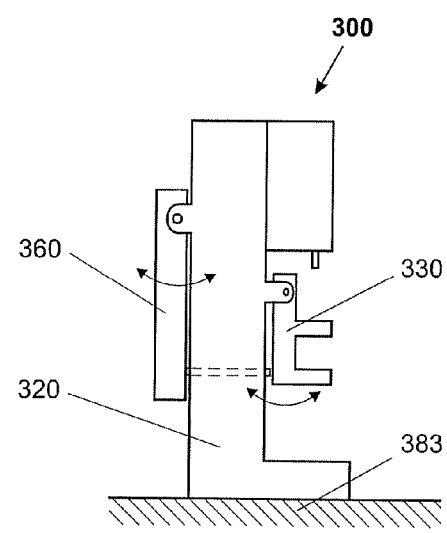
FIG. 3 is a schematic representation of an exemplary dosage-dispensing device shown in plan view in a second embodiment, wherein the receiving device and the actuator are configured as pendulums and pivotably supported.

A variety of measures can be taken to reduce such vibrations, in particular tilting moments acting on the support base 383. FIG. 3 illustrates schematically and in plan view a second embodiment of a dosage-dispensing device 300. In this dosage-dispensing device 300 not only the receiving device 330, but also the actuator 360, is connected through a pendulous suspension to the holder device 320. At least the horizontally directed force components of the shock waves are thereby compensated and the tilting moments in the fastening area between the holder device 320 and the support base 383 are thus eliminated or at least reduced.

Figure 4:
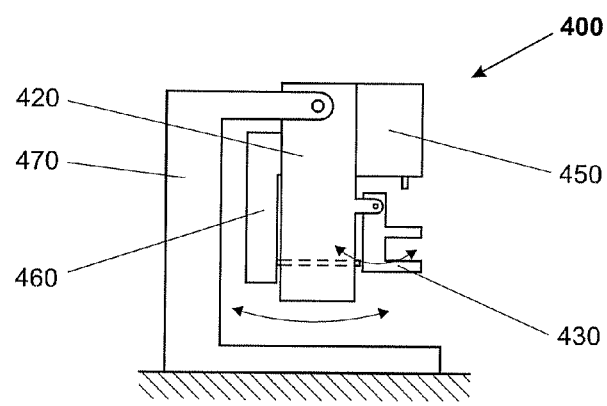
FIG. 4 is a schematic representation of an exemplary dosage-dispensing device shown in plan view in a third embodiment, wherein the receiving device is pivotably supported on the holder device, and the holder device, the actuator and the drive device are configured as one rigid unit that is pivotably suspended from a pedestal, comparable to a pendulum.

A third exemplary embodiment of the dosage-dispensing device 400 is shown in a schematic representation and in plan view in FIG. 4. The receiving device 430 is pivotably supported on the holder device 420. The actuator 460 and the drive device 450 are rigidly connected to the holder device 420. The holder device 420, in turn, is connected to a pedestal 470 through a pendulous suspension. As a result of this arrangement, the reactive forces will cause the holder device 420 to recoil together with the actuator 460 and the drive device 450. The proportion between the angle of deflection or, more specifically, the recoil amplitude of the holder device 420 on one hand and the angle of deflection or swing amplitude of the receiving device 430 on the other hand is the inverse of the ratio between their respective mass moments of inertia relative to their associated pivotal axes.

All of the embodiments shown in FIGS. 2 to 4 include freely swinging masses. If the resonance frequency of the pendulous masses equals the frequency of the actuator, this could lead to a resonant increase of the pendulum movements and thus to a disruption of the dosage-dispensing operation. To prevent this from happening, one can provide end stops and/or damper elements for each of the pivotably suspended masses. As a further possibility, the generation of shock waves by the actuator could be controlled so that they act against the pendulum movements and thus against a resonant increase. However, the prerequisite for this is that all of the suspended pendulous masses have equal mass moments of inertia relative to their respective pivot axes.

Figure 5:
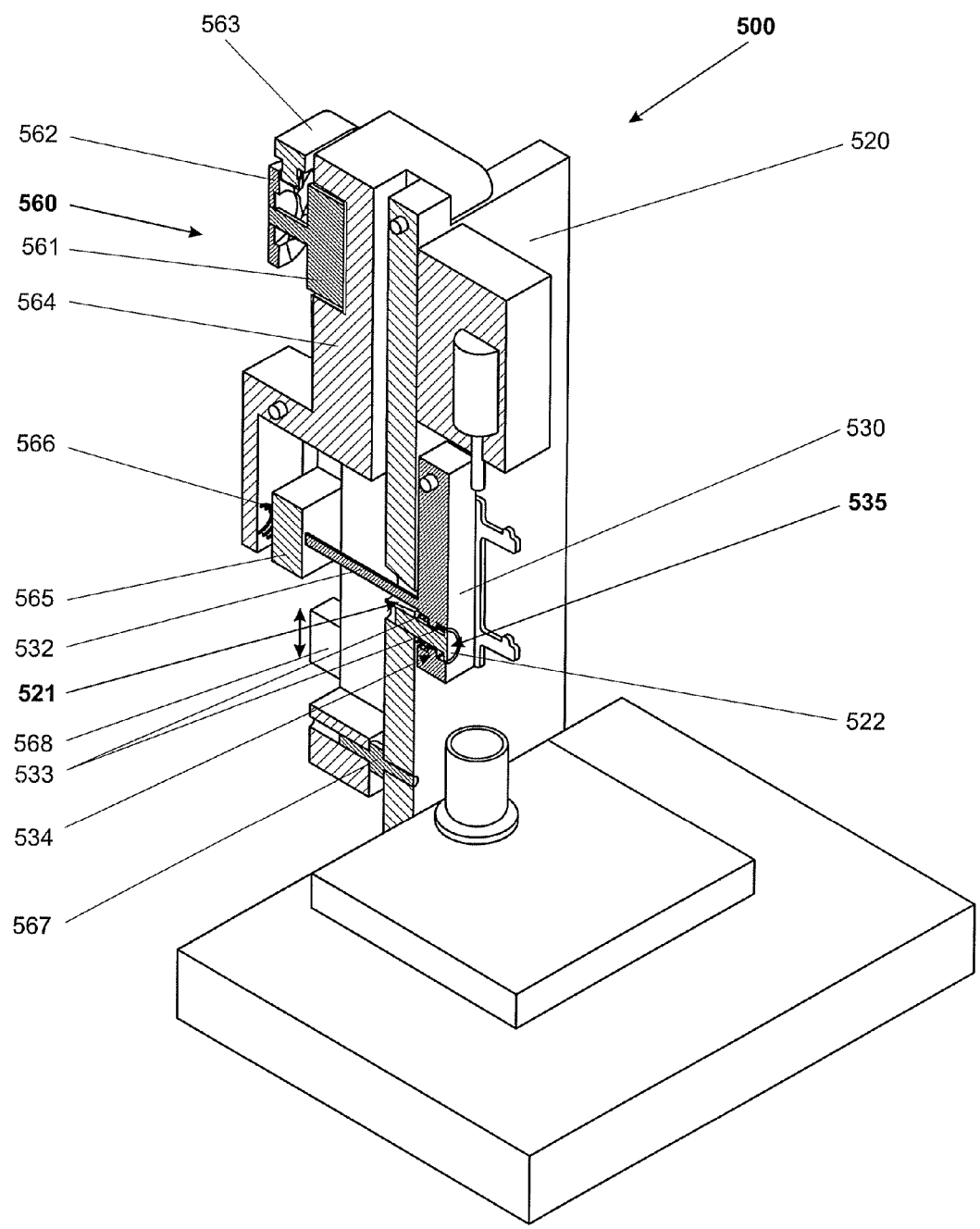
FIG. 5 is a three-dimensional representation of an exemplary dosage-dispensing device shown in a partially cross-sectional view, wherein the arrangement of the holder device, the actuator and the receiving device is analogous to the second embodiment illustrated in FIG. 3.

FIG. 5 shows a three-dimensional and partially sectional view of an exemplary dosage-dispensing device 500, wherein the arrangement of the holder device 520, the actuator 560 and the receiving device 530 in relation to each other conforms to the second embodiment as shown in FIG. 3.

The receiving device includes a push rod 532 which reaches through a passage 521 that is formed on the holder device 520. The passage 521 is appropriately configured so that the push rod 532 does not touch the holder device 530 even during the outward swing of the receiving device 530. The receiving device 530 further includes a positioning- and end stop element 535 which contains (e.g., consists in essence of) a bore hole 534 formed on the receiving device 530, two spring elements 533, and a collared bolt 522 that is connected to the holder device 520. The first spring element 533 which is arranged between the holder device 520 and the receiving device 530 serves to push the receiving device 530 away from the holder device 520. This first spring element 533 is counteracted by the second spring element 533 which is arranged between the collar of the collar bolt and the receiving device 530. As a result of the spring forces of the two spring elements 533 the receiving device 530 is held in position in relation to the holder device 520.

The actuator 560 includes an actuator motor 561 which drives a tensioning wheel 562 that carries several sawtooth-like ramps. To give a better view of the tensioning wheel 562, the actuator motor 561 is shown partially in sectional representation wherein the details have been omitted. The actuator motor 561 is arranged in the actuator housing 564. By way of the sawtooth-shaped ramps of the tensioning wheel 562, a tensioning lever 563 which is pivotably connected to the actuator housing 564 is pushed against the propulsion spring 566 whereby the latter is pre-tensioned. A hammer mass 565 which is connected to the tensioning lever 563 is accelerated by the propulsion spring 566 towards the push rod 532 as soon as one of the ramp edges of the tensioning wheel 562 releases the tensioning lever 563. As soon as the hammer mass 562 collides with the push rod 532, a shock wave is generated in the push rod 532 which is transferred through the push rod 532 to the receiving device 530 and the dosage-dispensing unit that is seated in it. As a result, the receiving device 530 performs a slight outward pivoting movement and is brought back to its starting position by the positioning- and end stop element.

The impact mechanism of the actuator 560 generates reactive forces which cause a recoil of the actuator 560 which is arranged in pendulous suspension on the holder device 520. As a means of limiting the swing range of the actuator 560 in relation to the holder device 520, a damper element 567 is arranged between the actuator 560 and the holder device 520.

Due to the differences between powder characteristics, the loosening of the powders also requires different impact frequencies and impact- or pulse amplitudes. While the impact frequency can be changed without a problem by varying the rate of rotation of the tensioning wheel 562, the setting of the impact amplitude within the mechanical concept of this embodiment can involve additional elements. As an example, the pre-tension of the propulsion spring 566 can be changed by means of adjusting elements such as shim inserts or an adjustable spring holder. The larger the impact amplitude of the mechanical pulses or shock waves that are to be generated in the receiving device 530, the larger the mass moment of inertia of the pivotably suspended actuator 560 needs to be in relation to the mass moment of inertia of the receiving device 530. The mass moment of inertia of the actuator 560 can be changed by attaching an additional pendulum mass 568 and/or by changing the distance of the additional pendulum mass 568 from the pivot axis of the actuator 560.

Figure 6:
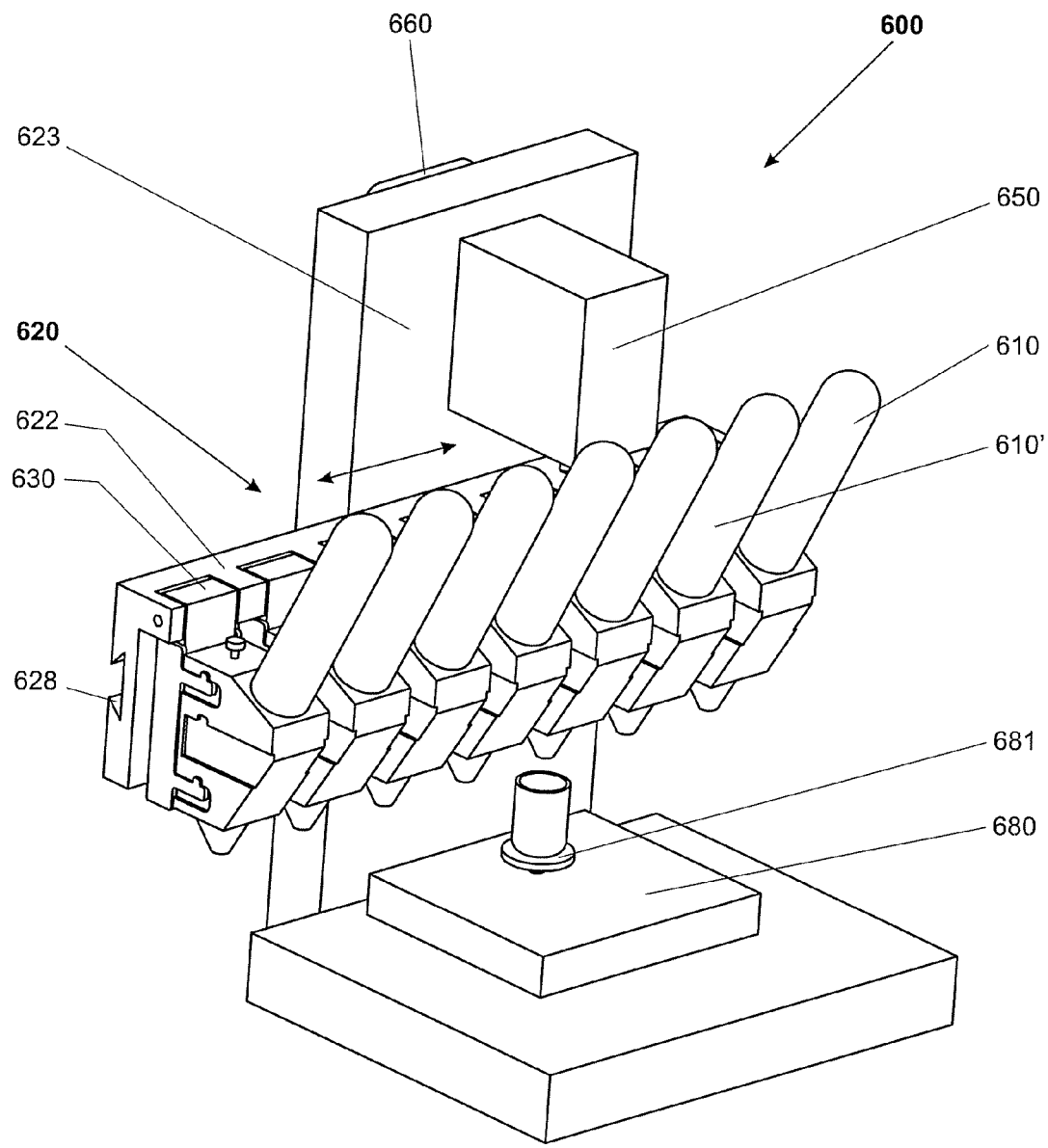
FIG. 6 is a three-dimensional representation of an exemplary dosage-dispensing device with several receiving devices arranged side-by-side, and with dosage-dispensing units seated in the receiving devices, wherein the arrangement of the holder device, actuator and receiving device is analogous to the first embodiment illustrated in FIG. 2.

FIG. 6 shows a three-dimensional illustration of an exemplary dosage-dispensing device 600 with several receiving devices 630 arranged side-by-side on a holder device 620. A dosage-dispensing unit 610 is seated in each receiving device 630. The arrangement of the holder device 620, the actuator 660 and the receiving device 630 conforms essentially to the first embodiment shown in FIG. 2. The holder device 620 has two main parts. The receiving devices 630 are arranged side-by-side on the first main part 622 which is connected to the second main part 623 through a linear guide track 628. The direction of the guided movement of the linear guide track 628 is essentially horizontal. Arranged on the second main part 623 in mutual alignment with each other are the actuator 660 and the drive device 650 as well as the load receiver 681 of a balance 680. The user of the dosage-dispensing device can select one of the dosage-dispensing units 610, 610', bring the selected dosage-dispensing unit 610, 610' into the dispensing position by a manual or automatic linear movement of the first main part 622 along the direction of the guided movement, and couple the dosage-dispensing unit 610, 610' to the drive device. To avoid the need for an individually dedicated actuator 660 for each of the receiving devices 630, the push rod (not shown in this drawing) needs to be configured in two parts. This two-part concept is next described and illustrated in detail in FIG. 7.

Figure 7:
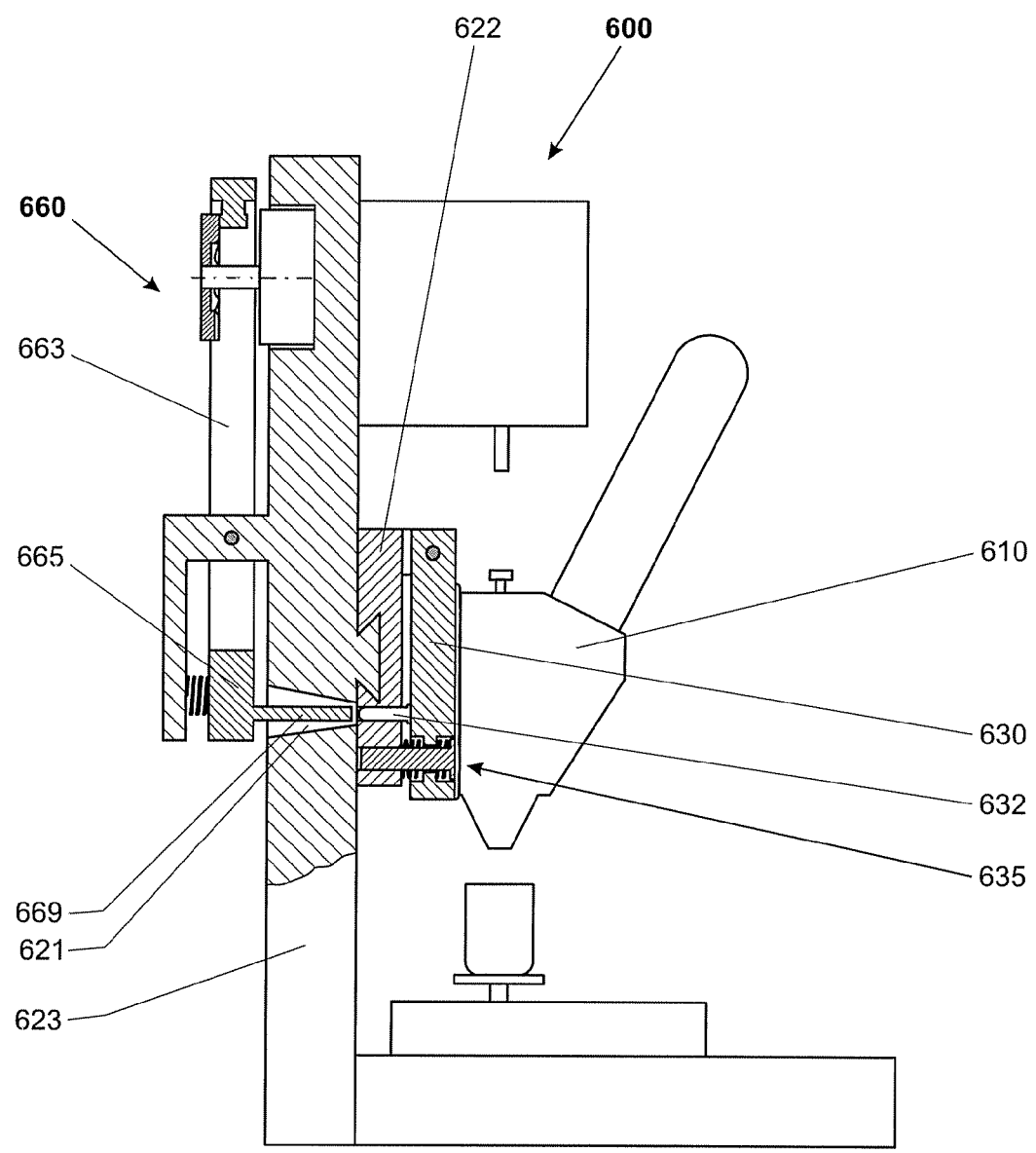
FIG. 7 is a schematic representation of the exemplary dosage-dispensing device of FIG. 6 shown partially in plan view and partially in sectional view.

FIG. 7 is a schematic representation of the dosage-dispensing device 600 of FIG. 6 shown partially in plan view and partially in sectional view. The description of the individual elements in FIG. 6 therefore also applies to the elements shown in FIG. 7. The sectional representation illustrates clearly how the actuator 660 operates, in particular how the tensioning lever 663 is pivotally connected to the second main part 623 and how the hammer mass 665 that is connected to the tensioning lever 663 delivers its action to the receiving device 630. The second main part 623 also has a passage 621 through which a push rod 669 reaches which is connected to the hammer mass 665. Functionally connected to each of the receiving devices 630 is an impact bolt 632 which is constrained with the freedom of linear movement inside the first main part 622. As a beneficial result of this layout, one and the same actuator 650 can deliver its action to any receiving device 630 and thus to any dosage-dispensing device 610 that is currently in the operating position.

Figure 8:
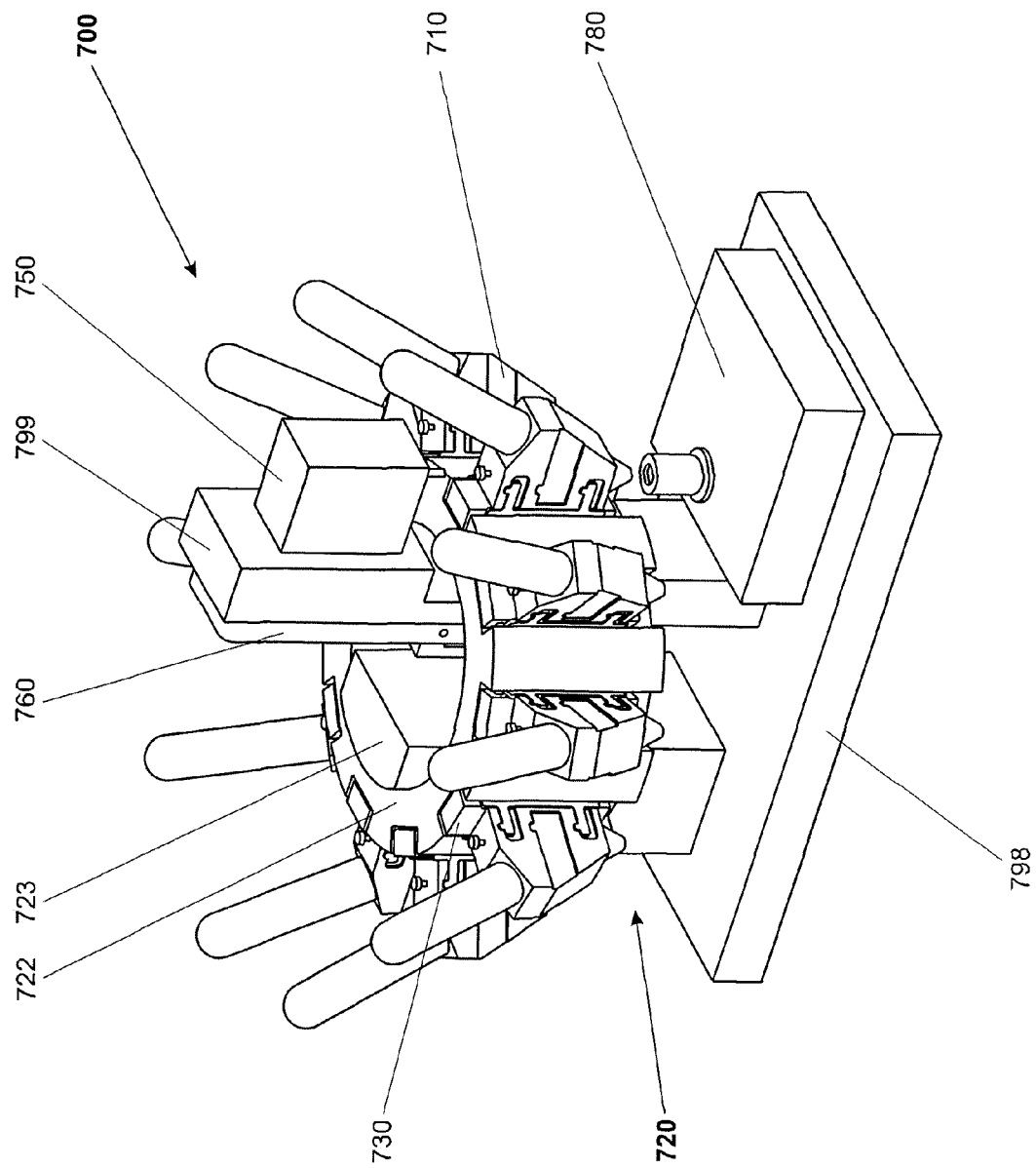
FIG. 8 represents a three-dimensional illustration of an exemplary dosage-dispensing device with a holder-device and, arranged on the latter, several receiving devices with dosage-dispensing units seated in them, wherein a first main part of the holder device has a ring-shaped configuration and is rotatably supported on a second main part of the holder device, wherein the actuator and the drive device are arranged on a stand, and wherein the stand and the second main part are connected to each other through a base plate.

FIG. 8 represents a three-dimensional illustration of a dosage-dispensing device 700. In its layout and arrangement of the individual components it is largely analogous to the dosage-dispensing device 600 shown in FIGS. 6 and 7. Unlike the arrangement shown in FIG. 6, the holder device 720 has a first main part 722 of a ring-shaped configuration, which is rotatably supported on a second main part 723. The drive device 750 and the actuator 760 are arranged on a stand 799 rather than on the second main part 723. Several receiving devices 730 are arranged on the first main part 722 on the side that faces away from the rotary axis of the first main part, with a dosage-dispensing unit 710 being seated in each receiving device 730. The holder device 720 and the stand 799 as well as the balance 780 are connected to each other through a base plate 798. Of course, the drive device 750 and the actuator 760 can also be arranged on the second main part 723, in which case the stand 799 would be omitted. Also, it is not required for each receiving device 730 to hold a dosage-dispensing unit 710.

The term "ring-shaped" in the context of the present disclosure is not limited to a geometrically circular configuration of the first main part 722. Triangular and polygonal configurations are also considered to be ring-shaped. Furthermore, the ring shape does not need to be closed; the first main part can also be configured in the shape of an open arc. First main parts configured as chains of the kind used for example in tool changers of large machine tools are considered to be included in the term "ring-shaped". Depending on the design of the linear guide mechanism or connecting element, it is of course possible to exchange the entire first main part with the installed dosage-dispensing units. This can eliminate the operation of exchanging individual dosage-dispensing units, so that entire prepared dosage-dispensing sets can be set into the dosage-dispensing device.

Although the disclosure has been described through the presentation of specific embodiments, it is obvious that further embodiments in numerous variations can be created from a knowledge of the present disclosure, for example by combining features from the individual embodiments with each other and/or exchanging individual function units of the embodiments. As an example, the mechanical actuator can be replaced by other types of actuators such as hydraulic or pneumatic cylinders, or by an electromagnetic or piezoelectric actuator. Accordingly, such combinations and alternatives are considered to be part of the disclosure.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

List of Reference Symbols
700, 600, 500, 400, 300, 200, 100 dosage-dispensing device
710, 610', 610, 110 dosage-dispensing unit
111 source container
112 dispensing head
113 delivery orifice
114 closure shaft
115 coupler device
119 hold
720, 620, 520, 420, 320, 220, 120 holder device
730, 630, 530, 430, 330, 230, 130 receiving device
131 pivot axis
132 holder element
750, 650, 450, 250, 150 drive device
151 drive shaft
760, 660, 560, 460, 360, 260, 160 actuator
261, 161 push rod
470, 170 pedestal
780, 680, 180 balance
681, 181 load receiver
190 target container
383, 283 support base
621, 521 passage
522 collar bolt
532 push rod
533 spring element
534 bore hole
535 positioning- and end stop element
561 actuator motor
562 tensioning wheel
663, 563 tensioning lever
564 actuator housing
665, 565 hammer mass
566 propulsion spring
567 damper element
568 pendulum mass
622 first main part
623 second main part
628 linear guide track
632 impact bolt
669 push rod
798 base plate
799 stand

What is claimed is:

1. Dosage-dispensing device for dosage material in powder- or paste form comprising:
   a holder device;
   at least one receiving device receiving at least one removable dosage-dispensing unit; and
   at least one actuator whose action is directed at the receiving device, wherein the receiving device is pivotably supported on the holder device and configured with freedom for performing an oscillatory pendulous movement in response to operation of the actuator along a pivot axis, wherein the pivot axis of the receiving device is arranged substantially with a horizontal orientation when the dosage-dispensing device is in its operating position; and
   a drive device with a drive shaft which can be connected to a closure shaft and/or to a stirring mechanism shaft of the dosage-dispensing unit by a coupler device, the coupler device being arranged in a horizontal plane that contains the pivot axis, and the coupler device having a length- and angle-adaptation capability to absorb axial displacements and changes of an angle between respective rotary axes of the closure shaft and the drive shaft which occur as a result of said pendulous movements.

2. Dosage-dispensing device according to claim 1, wherein to take up reactive forces sustained by the holder device as a result of mechanical impact pulses generated by the actuator, the actuator is functionally interposed between the holder device and the receiving device.

3. Dosage-dispensing device according to claim 1, wherein the actuator is functionally connected to the receiving device, and includes a pendulum that serves to absorb reactive forces of mechanical impact pulses of the actuator.

4. Dosage-dispensing device according to claim 3, wherein the pendulum comprises a pendulum rod and a pendulum mass, wherein the pendulum mass can be changed by adding or removing weight pieces.

5. Dosage-dispensing device according to claim 4, wherein the pendulum mass can be moved along the pendulum rod and locked in a desired position on the pendulum rod.

6. Dosage-dispensing device according to claim 3, wherein a mass moment of inertia of the pendulum relative to the pivot axis of the pendulum is at least equal to a mass moment of inertia of the receiving device with installed dosage-dispensing unit relative to the pivot axis.

7. Dosage-dispensing device according to claim 3, wherein substantially the entire holder device is pivotably suspended to serve as pendulum mass.

8. Dosage-dispensing device according to claim 1, comprising:
at least one adjustable propulsion spring serving for adjustment of an impact pulse amplitude of the actuator and/or comprising a damper element and/or of a spring element.

9. Dosage-dispensing device according to claim 1, wherein the receiving device comprises:
a pivoting range which can be delimited by adjustable elements, and/or that the receiving device comprises a positioning- and end stop element.

10. Dosage-dispensing device according to claim 1, wherein the actuator comprises:
a hammer mass driven by a propulsion spring, wherein the propulsion spring can be tensioned by a tensioning mechanism and instantaneously released, the hammer mass being configured to be accelerated by the propulsion spring, and a shock wave being produced in the receiving device through the impact of the hammer mass on the receiving device or on component parts that are connected to the receiving device.

11. Dosage-dispensing device according to claim 2, wherein a first main part of the holder device comprises a horizontal linear guide and is connected by way of said linear guide to a second main part of the holder device, wherein on the first main part of the holder device a plurality of receiving devices are arranged side-by-side with the freedom of individual pivoting movement.

12. Dosage-dispensing device according to claim 2, wherein a first main part of the holder device is configured with a ring-shaped configuration and supported on the second main part of the holder device with mobility to rotate about a vertical axis, wherein on an outside of the ring-shaped first main part a plurality of receiving devices are arranged side-by-side with the freedom of individual pivoting movement.

13. Dosage-dispensing device according to claim 11, wherein in an area of the drive device an actuator is arranged in such a way that it is possible with the impact pulses of said actuator to generate oscillatory pivoting movements only in the receiving device that is currently stationed in the area of the drive device.

* * * * *